Figure 1:
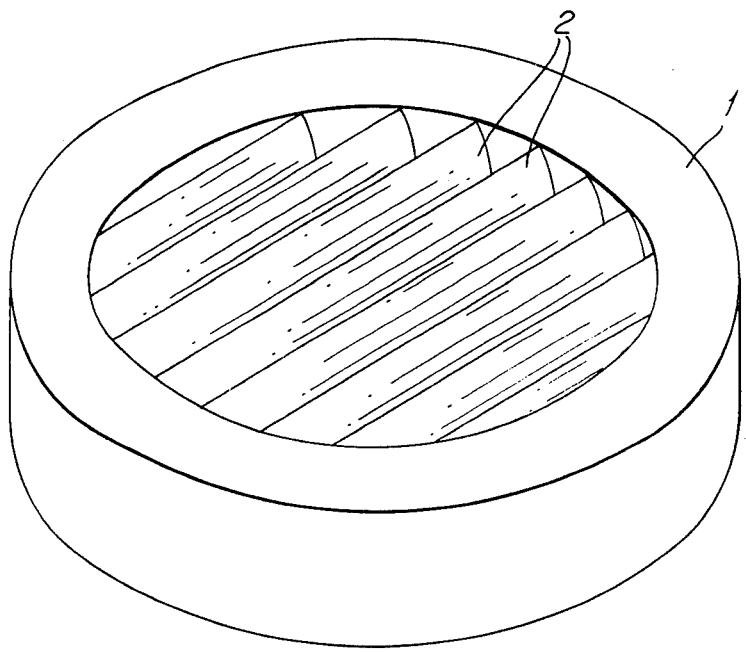

United States Patent [19]

Haffenden

[11] 4,078,550

[45] Mar. 14, 1978

[54] GRID FOR MELT-SPINNING

[75] Inventor: Eric Haffenden, Harrogate, England

[73] Assignee: Imperial Chemical Industries Limited, London, England

[21] Appl. No.: 664,737

[22] Filed: Mar. 8, 1976

[30] Foreign Application Priority Data

Mar. 13, 1975 United Kingdom ............... 10457/75

[51] Int. Cl.² .............................................. D01D 1/04
[52] U.S. Cl. .......................... 126/343.5 A; 425/378 S
[58] Field of Search .......................... 425/378 S, 382.2; 126/343.5 A

[56] References Cited

U.S. PATENT DOCUMENTS 3,010,147  11/1961  Davies et al. ............ 126/343.5 A X

FOREIGN PATENT DOCUMENTS 126,984  7/1959  U.S.S.R. .......................... 425/378 S

Primary Examiner—Robert D. Baldwin
Attorney, Agent, or Firm—Roderick B. Macleod

[57] ABSTRACT

A melt grid for the melting of particulate, solid polymer, comprising a receiving face onto which solid polymer is fed and an effluent face from which molten polymer flows, the grid being supplied with heat in a region removed from the effluent face and there being an impediment to the passage of heat between the region to which heat is supplied and the effluent face.

1 Claim, 2 Drawing Figures

U.S. Patent      March 14, 1978      4,078,550

GRID FOR MELT-SPINNING

The present invention relates to a melt grid for the melting of particulate, solid polymer.

According to the present invention we provide a melt grid for the melting of particulate, solid polymer, comprising a receiving face onto which solid polymer is fed and an effluent face from which molten polymer flows, the grid being adapted to be supplied with heat within a region removed from the effluent face, and there being an impediment to the passage of heat between the region to which heat is to be supplied and the effluent face.

By the impediment to the passage of heat, we mean that the ease of passage of heat is to be less than would normally be experienced in connection with normal structural requirements for the grid. Thus, for example, there may be present in the member or members comprising the grid, at a position between the region to which heat is to be supplied and the effluent face, a layer of material of thermal conductivity less than that of the material comprising the remainder of the member or members. Such layer of less thermal conductivity may extend completely across a member, or partially across it. Otherwise, or in addition, an aperture may be provided in the member or members comprising the grid at a position between the region to which heat is to be supplied and the effluent face. An aperture may be evacuated, or may contain a fluid, which may be a gas. The fluid may be continuously renewed.

The supplying of the heat to the grid may be effected by providing at least one duct through the material of the grid in the appropriate region adapted for the passage of liquid or vapour at an appropriate temperature. The appropriate region of the grid may be heated by conduction from a member with which it is in contact and to which heat is supplied. The grid may be heated electrically for example by the passage of an electrical current through it or through an electrically conductive element running through it.

By arranging for the grid to be supplied with heat within a region removed from the effluent face and by there being an impediment to the passage of heat between the region to which heat is to be supplied and the effluent face, it is possible to arrange for a rapid heat transfer to the polymer particles to effect rapid melting and yet to avoid overheating of the liquid polymer.

The melt grid should preferably be fabricated from metal or alloy having no adverse chemical effect on the polymer, and having a high thermal conductivity, except in the region where there is an impediment to the passage of heat.

The melt grid according to the present invention may be used for the melting of any polymer commonly formed into shaped articles by melt extrusion. Examples of such polymers are polyesters, polyamides and polyolefines.

According to the present invention, we also provide an apparatus for the melt extrusion of particulate polymer comprising a melt grid, means for gravity feed of particulate polymer to the grid, a melt pool for receiving molten polymer from the grid and means for removing molten polymer from the melt extrusion means, wherein the melt grid comprises a receiving face for the particulate polymer and an effluent face from which the molten polymer flows, the grid being adapted to be supplied with heat within a region removed from the effluent face, and there being an impediment to the passage of heat between the region to which heat is supplied and the effluent face.

Associated with the melt grid there may also be means for forcing the particulate polymer onto the receiving face of the grid with improvement of the rate of melting, provided that the availability of heat is sufficiently high.

According to the present invention we also provide a process for the melt extrusion of particulate polymer comprising feeding polymer particles to a melt grid to which heat is supplied, collecting molten polymer from the grid in a melt pool, removing molten polymer from the melt pool substantially at the rate at which it is collected and feeding it to extrusion means, wherein the melt grid comprises a receiving face for the particulate polymer and an effluent face from which the molten polymer flows, the grid being adapted to be supplied with heat within a region removed from the effluent face, and there being an impediment to the passage of heat between the region to which heat is supplied and the effluent face.

Figure 2:
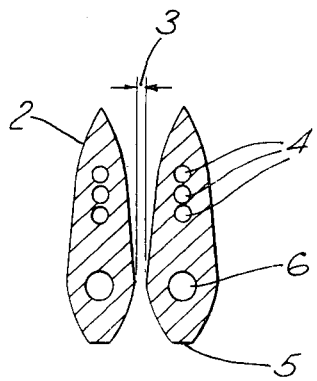

A specific embodiment of the present invention will now be described with particular reference to FIGS. 1 and 2, in which FIG. 1 shows a melt grid according to the present invention, FIG. 2 shows a cross section of a fin of FIG. 1.

Referring to FIGS. 1 and 2, a melt grid comprises a collar 1 and eight parallel fins 2. The collar 1 and the fins 2 are of aluminum. The collar 1 is of outside diameter 334 mm. The minimum separation between fins is 3 mm. 3. Three parallelly disposed elongated apertures 4 extend throughout the length of each fin and are of uniform cross-section throughout the length of each fin and are of uniform cross-section throughout their length and each of diameter 6 mm. The aperture 4 nearest to the effluent face 5 is distant from it by 38 mm. A further aperture 6 extends along the length of each fin and is of diameter 11 mm. and distant from the effluent face 5 by 14 mm.

In operation, a liquid heating medium is pumped through apertures 4 providing heat for the melting of polymer particles in contact with the fins 2. Conduction of heat from the surface of the apertures 4 to the effluent face 5 is impeded by the presence of the aperture 6, which limits the cross-sectional area of conductive material at the level of the aperture 6. In use for extrusion, the grid was appropriately enclosed and provided with means for forcing polymer particles onto its upper surface, that is, a screw pressure melter, a melt pool for receiving the melted polymer and a pump for removing the molten polymer from the melt pool for extrusion.

Using poly(ethylene terephthalate) of intrinsic viscosity (as measured at 25° C. in orthochlorophenol at a concentration of 1 g. of polyester per 100 ml. of solvent) of 0.65 dl. per g., the polyethylene terephthalate was melted at a rate of 36 kg. per hour to give a temperature in the melt pool of 285° C. The melt pool pressure was 125 pounds per square inch.

Carrying out the same procedure, but with the distinction that a melt grid of similar shape and size but without the aperture 6, using poly(ethylene terephthalate) of the same intrinsic viscosity (0.65), the melt pool pressure was 60 pounds per square inch.

The higher melt pool pressure in the first case indicates a thicker layer of moletn polyester in contact with the hotter surface of the receiving face of the melt grid due to the more rapid heat transfer.

We claim:

1. An improved melt grid for the melting of solid particulate polymer at higher throughputs, which melt grid comprises a plurality of elongated aligned fins defining an upper receiving face and a lower effluent face connected by at least one first aperture of elongated cross-section, at least one second aperture containing a heating medium longitudnally disposed within one of said fins intermediate the upper and lower faces providing heat for rapid melting of polymer particles in contact with the melt grid, wherein the improvement comprises said melt grid has at least one third aperture containing an insulating medium longitudnally disposed intermediate said second aperture and said lower face, whereby thermal conductivity from said second aperture to said lower face is reduced to avoid overheating of the liquid polymer.

* * * * *